United States Patent
Yuasa et al.

(10) Patent No.: US 6,252,624 B1
(45) Date of Patent: Jun. 26, 2001

(54) THREE DIMENSIONAL DISPLAY

(75) Inventors: Kimihiro Yuasa; Kento Okoshi; Hirofumi Kondo; Hironobu Ichige, all of Sodegaura; Takeki Kofuji, Tokyo, all of (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/041,243

(22) Filed: Mar. 12, 1998

(30) Foreign Application Priority Data

Jul. 18, 1997 (JP) .................................................. 9-193985
Feb. 10, 1998 (JP) ................................................ 10-028388

(51) Int. Cl.⁷ ............................ H04N 9/47; H04N 13/04; H04N 15/00

(52) U.S. Cl. ................................................ 348/56; 348/57

(58) Field of Search ............................... 348/51, 53, 56, 348/57, 42; 359/462–477, 376; 345/31–32, 9, 139; 342/176, 180

(56) References Cited

U.S. PATENT DOCUMENTS

| | | | |
|---|---|---|---|
| 4,719,507 | 1/1988 | Bos | 348/57 |
| 4,772,943 | 9/1988 | Nakagawa et al. | 348/57 |

FOREIGN PATENT DOCUMENTS

| | | | |
|---|---|---|---|
| 032 362 | 7/1981 | (EP) | G02F/1/137 |
| 0 528 397 | 2/1993 | (EP) | G02F/1/1333 |
| 61-227498 | 10/1986 | (JP). | |
| 5-78017 | 10/1993 | (JP). | |
| 6-29914 | 4/1994 | (JP). | |
| 8-23663 | 3/1996 | (JP). | |

OTHER PUBLICATIONS

"Plastic LCD Substrates that Combine Optical Quality and High Use Temperature" by A. Stein, et al.; SID 96 Applications Digest; Publication Date: May 14, 1996. (pp. 11–14).
"PDLC Display Incorporating Plastic Substrates With High Temperature Stability" Research Disclosure; Feb. 1995 (1 page).
Patent Abstracts Of Japan; Publication No. JP–07 278547 Publication Date: Oct. 24, 1995; (1 page).
Patent Abstracts Of Japan; Publication No. JP–09 085875 Publication Date: Mar. 31, 1997; (1 page).

*Primary Examiner*—Vu Le
(74) *Attorney, Agent, or Firm*—Flynn, Thiel, Boutell & Tanis, P.C.

(57) ABSTRACT

A three-dimensional display is provided with a display device alternatively displaying an image for the right eye and an image for the left eye in division of the images at predetermined time periods. A liquid crystal shutter disposed in front of the display device is operated in synchronization with image switching of the display device, and the image transmitted through the liquid crystal shutter is observed as a three-dimensional image through polarized glasses of which polarizing directions differ in the right and left from each other. The liquid crystal cell which serves as a liquid crystal shutter has a structure of a ferroelectric liquid crystal held between two sheets of resin film substrates and the ferroelectric liquid crystal contains more than 10 wt % of ferroelectric liquid crystal polymer so that it can respond to a large size display device and a high speed motion. A retardation plate to compensate elliptical polarization of the polarized glasses prevents lowering of contrast of the display due to the elliptical polarization peculiar to the operation mode of the liquid crystal cell and reduces a double reflection of the image, by setting the condition of $|\Delta n_1 d_1 - \Delta n_2 d_2| \leq 50$ nm in the range of light wavelength from 400 nm through 900 nm, for the retardation ($\Delta n_1 d_1$) of the retardation plate and a retardation ($\Delta n_2 d_2$) of a liquid crystal cell forming the liquid crystal shutter.

10 Claims, 6 Drawing Sheets

THREE DIMENSIONAL DISPLAY

BACKGROUND OF THE INVENTION

1. Field of the Invention

The present invention relates to a three-dimensional display through which a three-dimensional vision can be observed, utilizing the parallax of the right and left eyes. The three-dimensional display is applied to the three-dimensional visualization of CAD, CAM and the like, and the three-dimensional visualization of Internet information as a terminal display of a computer for instance, as well as the three-dimensional visualization of computer games, three-dimensional display in the fields of medical care or art and so on.

2. Description of the Related Art

Influenced by the progress in information terminal which centers personal computers as a main tool, growth of the information network which is represented by the Internet, the amount of information handled by individuals is rapidly increasing. Particularly, concerning about image information, there has arisen loud calls for display equipment which can express more accurate and more real images, in accordance with the increase of information manageable for individuals due to the improvement on compression and transmission technology thereof. In order to respond to such a request, improvement to higher definition and the like has been made in various display devices such as LCD, EL panel, CRT and so on.

A latent demand is strong for the three-dimensional visualization to apply to an industrial use, a commercial use of such as a virtual mall and the like, and an amusement use of such as games and the like. However, for instance, when the liquid crystal optical shuttering method is used to materialize the demand, due to the limitation of the size of the optical shutter, the spectacles must have a shutter function, therefore it is not easy to say that the method is getting sufficient popularity because of its sense of incompatibility.

It has been long known that a pseudostereoscopic view can be obtained by simultaneously watching two different images with each right and left eye respectively. As a method to obtain three-dimensional images of two photographs and the like with the naked eyes, a parallel method and an intersection method have been known. When using these methods, however, training of viewers for the method is usually required. In addition, the size of the two images, and the distance of the two images placed can not be freely changed.

On the other hand, there is another method called the anaglyph method. An image for the right eye and an image for the left eye are drawn in a write-over manner with different colors. That is, the viewer puts on a pair of colored glasses which passes different colors through right and left glasses (for instance, red and blue). Separately watching the breakdown images with a right eye and a left eye can give the image a three-dimensional look. In this method, there is no limitation for the size of image, but it has a disadvantage that the coloring of the image may be spoiled because the method uses 2 colored filters.

Recently, many methods which can obtain a three-dimensional image have been proposed, utilizing a liquid crystal cell as an optical shutter. A displayed image through a CRT and the like is time divided and the image for the right eye and the image for the left eye are alternatively sent to right and left eyes respectively. There are mainly following two methods according to the position where the optical shutter is placed.

(1) A method to use glasses with a liquid crystal optical shutter.

For instance, the following three-dimensional television is proposed (Japanese Patent Laid-open No. Sho 61-227498). That is, in a three-dimensional television which makes it possible to stereoscopically recognize the image of a subject by alternatively opening and shutting optical shutters prepared on each left and right glass of stereoscopic glasses in synchronization with each field of the right and left image of a subject displayed on the TV screen or in synchronization with a switching period of each field thereof, a three-dimensional television is proposed which is provided with a driving means that alternatively supplies designated AC voltage to both liquid crystal cells in synchronization with switching of the image, using a twisted nematic liquid crystal cell as the optical shutters of both eyes for the left eye and the right eye.

(2) A method in which a liquid crystal shutter is disposed in front of a display device, and a viewer uses a pair of polarized glasses.

For instance, the following pseudostereoscopic display has been proposed, (Japanese Patent Publication No. Hei 05-78017). In a pseudostereoscopic display composed of a polarizer and a liquid crystal cell are placed leaving a space therebetween in front of a display screen, a drive circuit which changes over the polarizing directions of light transmitted from the display screen through the liquid crystal cell in a division of the images at predetermined time period is connected to the liquid crystal cell by impressing an AC voltage synchronized with a frame signal of the display screen, and a polarized glasses in which the polarizing directions of the right eye and the left eye for recognition of the displayed light are different from each other, the proposed pseudostereoscopic display is characterized in that a retardation of the liquid crystal cell is from 0.1 to 0.15 $\mu$m, rotating angles of the optical axis by reversing the polarity of the applied voltage is from 70 degrees to 110 degrees, the median of two directional axes which is possible to adopt as an optical axis and a polarization axis of a polarizer nearly coincide with each other, and a polarizer of a polarized glasses is an elliptical polarizer having a polarizing ability same as or close to a circular polarizing ability.

In case of the former method (1), a liquid crystal optical shutter is used on the glasses. As a result, the weight of the glasses increases, and gives a feeling of fatigue when using for a long time, and electrode wire for driving the glasses gives the viewer a sense of incompatibility in wearing the glasses. When many viewers look at the same time, glasses with similar optical shutters are necessary, which increases the cost. Further, since a twisted nematic (TN) type liquid crystal cell is used as an optical shutter, the response delays, images flicker, and right and left images are doubled.

In case of the latter method (2), simple polarized glasses are sufficient for the viewer, and a ferroelectric liquid crystal is used as an optical shutter in the display device, which makes it possible to respond to a moving image display. However, the cell is made of a conventional glass substrate, so upsizing and application to a large size CRT and the like are difficult. Furthermore, it is necessary to make a cell retardation as small as from 0.1 to 0.15 $\mu$m so that the liquid crystal cell is allowed to behave as a $\lambda/4$ plate. In accordance with the above mentioned reduction of the cell retardation, the actual cell thickness needs to be made considerably thin, which causes lowering of a production yield of the cell. In addition, in order to widen the rotation angle of the optical axis, material for a large liquid crystal whose tilt angle $\theta$ about 45 degrees is required. The electric field responsivity and orientation property are usually impaired to that extent, so development of a new material is sometimes required.

A first object of present invention is to prevent lowering of a display contrast caused by an elliptical polarization which is peculiar to the operation mode of the liquid crystal cell and to provide a three-dimensional display which can reduce an occurrence of double images of the right and left images.

As the method (2) in which a viewer uses polarized glasses, a pseudostereo display has been proposed, the pseudostereo display characterized in that a ferroelectric liquid crystal cell mixed with a dichroic coloring agent in front of the display screen, a displayed light transmitted through the liquid crystal is changed by connecting a driving means which impresses an AC voltage synchronized with an image frame signal to the liquid crystal, into two polarizing directions in a manner of division of the images at predetermined time period, a λ/4 plate is placed in front of the liquid crystal cell to change the displayed light to a circular polarization having a different direction, and in order to observe the circular polarization, each right and left polarizer of the polarized glasses has a circular polarization which is reverse in direction to each other. (Japanese Patent Publication No. Hei 6-29914).

When using this system, because the cell uses a glass substrate, it is difficult to upsize and also difficult to apply to a large size CRT. And it results in a high cost as a system due to the usage of a λ/4 plate and a circular polarizer.

Furthermore, another three-dimensional image display is proposed. In a three-dimensional image display which has a moving image display to display an image signal on a screen, a polarizer provided in front of the moving image display, a liquid crystal panel provided in front of the polarizer, for switching the polarizing direction based on a synchronizing signal with the aforementioned image signal, and polarized glasses in which the polarizing directions of a right and left polarizer differ from each other by 90 degrees and which transmit and shield the light of the image, the proposed three-dimensional image display is characterized in that the material of liquid crystal for a liquid crystal panel is mixed with one percent or less by weight of a multichroic coloring agent to reduce the effect of the elliptical polarization and improve the visivility. (Japanese Patent Publication No. Hei 8-23663).

Since this display uses the conventional TN cell, a moving image display at high speed is not available due to the special quality thereof. In addition, since the multichroic coloring agent which is mixed to improve visivility, further hinders responsivity, the mixing amount of the coloring agent can not be more than 1%. And another disadvantage is that the above display can not be applied to a moving image display with a large screen because it uses the conventional type liquid crystal cell.

A second object of the present invention is to provide a three-dimensional display which can be applied to a large size display device and respond to a high speed motion.

SUMMARY OF THE INVENTION

In a three-dimensional display which has a display device to alternatively display an image for the right eye and an image for the left eye in division of the images at predetermined time period, and a liquid crystal shutter disposed in front of the display device, the liquid crystal shutter is operated in synchronization with the image switching of the display device, and the image transmitted through the liquid crystal shutter is observed through polarized glasses having different polarizing directions in the right and left glasses as a three-dimensional image, the three-dimensional display according to present invention is characterized in that the liquid crystal cell to serve as the liquid crystal shutter is defined by a ferroelectric liquid crystal held between two sheets of resin film substrates.

It is desirable that the alternatively displaying speed of the display device is high enough for the viewer not to recognize any flickering. More specifically, when the speed is more than about 30 Hz, the flickering can not be observed. Therefore it is preferable that the display device is able to switch images at a high speed of more than 30 Hz. As a concrete example of the display device, a CRT (Cathode Ray Tube), a liquid crystal panel such as TFT (Thin Film Transistor), a plasma display, an EL (Electro-Luminescence) panel, and a LED (Light-Emitting Diode) can be cited.

Since a resin film liquid crystal cell which is easy to upsize is used as a liquid crystal shutter in the present invention, the present invention can be applied to a large size display device. Especially, the present invention makes it possible to materialize the upsizing to the extent of more than 14 inches, which is difficult with a liquid crystal panel using a conventional glass substrate. In addition since a resin film substrate is used as a liquid crystal shutter, the liquid crystal shutter can be made in a curved shape so that the shutter can be used in close contact with a curved surface panel, which makes it easy to utilize an inexpensive CRT having a curved display surface.

As the ferroelectric liquid crystal, the following specific examples from (a) through (l) can be listed.

In the present invention, the use of the ferroelectric liquid crystal makes it possible to respond to high speed and to provide a three-dimensional display which can easily respond to a moving image.

(a) Acrylate main chain series polymer liquid crystal (Chemical constitutional formula 1)

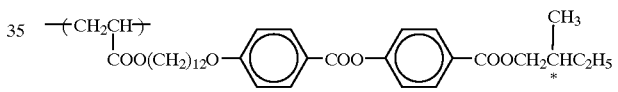

(Chemical Constitutional Formula 2)

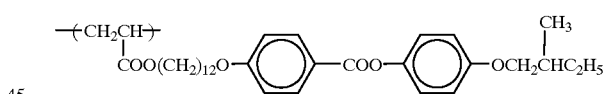

(b) Methacrylate main chain series polymer liquid crystal (Chemical Constitutional Formula 3)

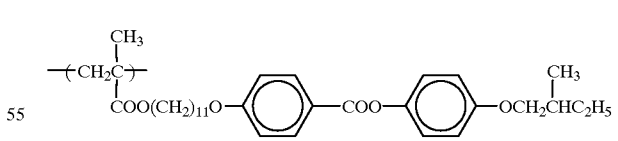

(Chemical Constitutional Formula 4)

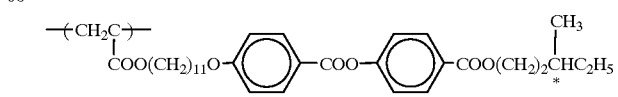

(c) Chloroacrylate main chain polymer liquid crystal (Chemical Constitutional Formula 5)

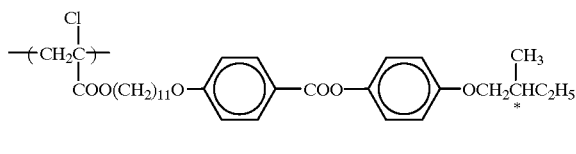

(d) Oxirane main chain polymer liquid crystal
(Chemical Constitutional Formula 6)

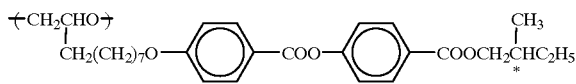

(e) Siloxane main chain polymer liquid crystal
(Chemical Constitutional Formula 7)

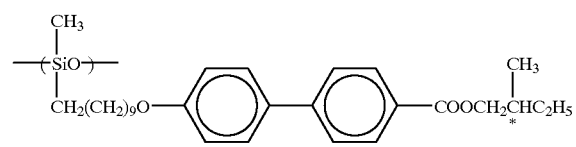

(f) Ester main chain series polymer liquid crystal
(Chemical Constitutional Formula 8)

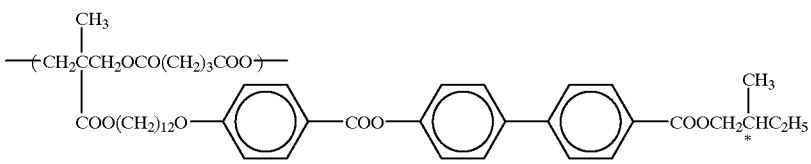

(Chemical Constitutional Formula 9)

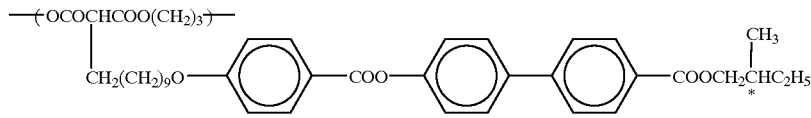

(Chemical Constitutional Formula 10)

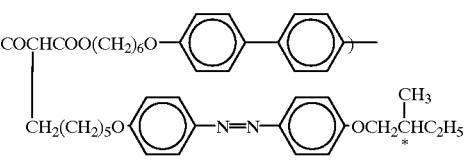

(g) Siloxane—Olefin main chain series polymer liquid crystal (Chemical Constitutional Formula 11)

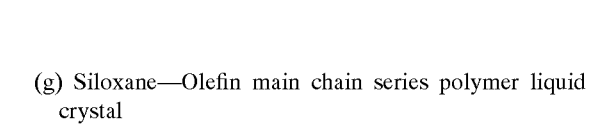

(Chemical Constitutional Formula 12)

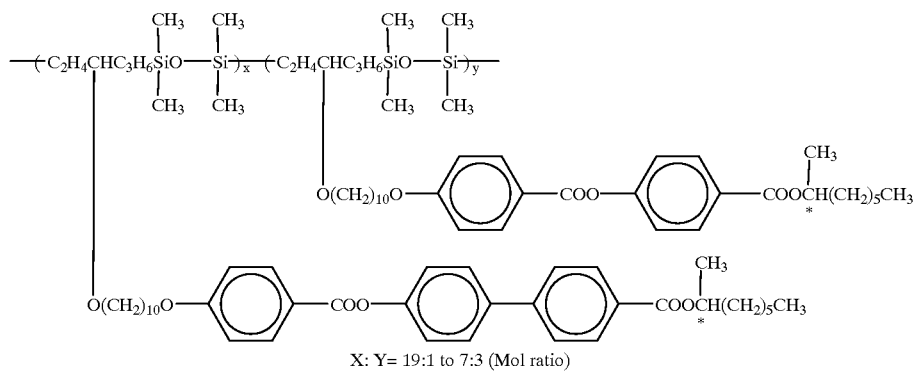

X: Y= 19:1 to 7:3 (Mol ratio)

(h) Schiff base series low molecular weight ferroelectric liquid crystal (Chemical Constitutional Formula 13)

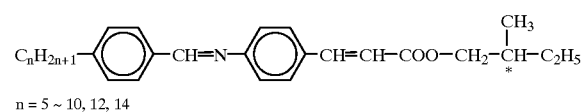

n = 5 ~ 10, 12, 14

(Chemical Constitutional Formula 14)

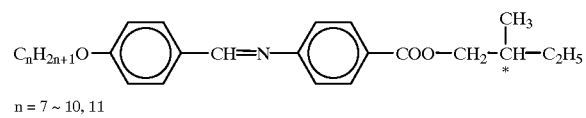

n = 7 ~ 10, 11

(Chemical Constitutional Formula 15)

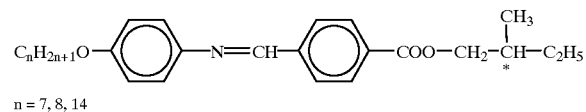

n = 7, 8, 14

(Chemical Constitutional Formula 16)

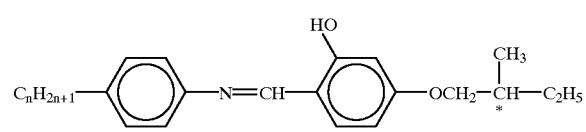

n = 4, 8, 12

(i) Azo and azoxy series low molecular weight ferroelectric liquid crystal (Chemical Constitutional Formula 17)

$C_2H_5CH-(CH_2)_n-O-\bigcirc-N=N-\bigcirc-O-(CH_2)_n-CH-C_2H_5$ (with O on N)

n = 4, 5

(Chemical Constitutional Formula 18)

$C_nH_{2n+1}O-\bigcirc-N=N-\bigcirc-O-CH_2-CH-C_2H_5$ n = 16

(j) Biphenyl and aromatic ester series low molecular weight ferroelectric liquid crystal (Chemical Constitutional Formula 19)

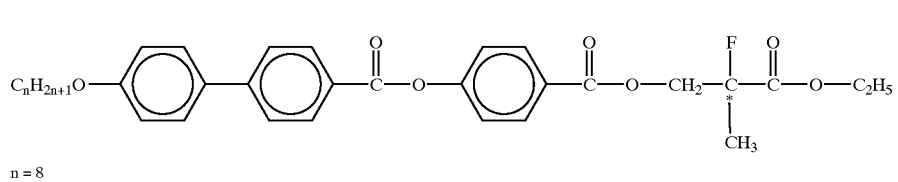

n = 8

(Chemical Constitutional Formula 20)

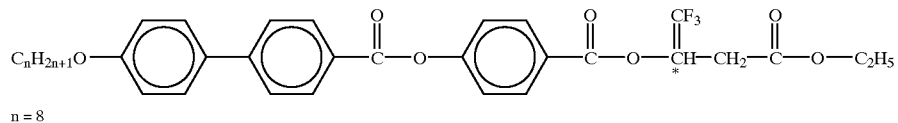

n = 8

(k) A low molecular weight ferroelectric liquid crystal introducing cyclic substituent such as halogen, and cyano base.

(Chemical Constitutional Formula 21)

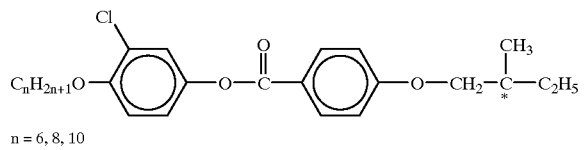

n = 6, 8, 10

(Chemical Constitutional Formula 22)

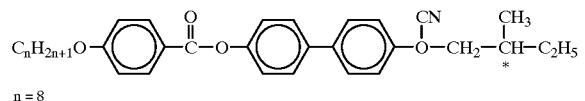

n = 8

(Chemical Constitutional Formula 23)

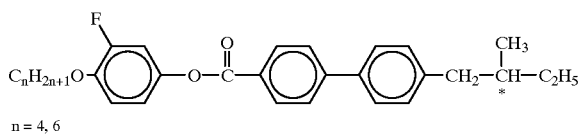

n = 4, 6

(l) A low molecular weight ferroelectric liquid crystal having a heterocyclic ring (Chemical Constitutional Formula 24)

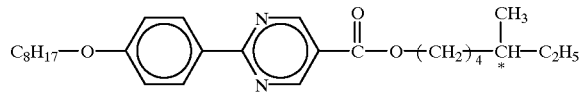

(Chemical Constitutional Formula 25)

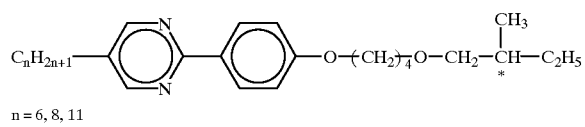

n = 6, 8, 11

It should be noted that compounds cited from (h) to (l) are typical ones of the low molecular weight ferroelectric liquid crystals, and the low molecular weight ferroelectric liquid crystal is not limited to these liquid crystals but the conventional liquid crystals on the market can also be usable.

Concerning the repetitive unit of the above described ferroelectric liquid crystal polymer, the skeleton of the chain can be replaced with biphenyl skeleton, phenyl benzoate skeleton, biphenyl benzoate skeleton, phenyl-4-phenyl benzoate skeleton. Benzene ring in the skeleton can be replaced with pyrimidine ring, pyridine ring, pyridazine ring, pyradine ring, tetrazine ring, cyclohexane ring, dioxane ring, dioxaborinan ring. Replacement with halogen radical or cyano radical such as fluorine, chlorine and so on, replacement with optically active radical such as 1-methylalkyl radical, 2-fluoroalkyl radical, 2-chloroalkyl radical, 2-chloro-3-methylalkyl radical, 2-trifluoromethylalkyl radical, 1-alkoxycarbonylethyl radical, 2-alkoxy-1-methylethyl radical, 2-alkoxycarbonyl-1-trifluoromethylpropyl radical is also possible.

The length of the spacer can be varied within the extent of 2 to 30 in length of methylene chain. The number average molecular weight of the ferroelectric liquid crystal polymer is preferably 1000 to 200,000.

The liquid crystal shutter serves to switch the polarization state into two states by switching the sign of the applied voltage. The liquid crystal cell to be the liquid crystal shutter is composed of a ferroelectric liquid crystal held between two sheets of resin film substrates with electrodes.

As the material for the resin film substrate, for instance, a crystalline polymer such as monoaxially or biaxially oriented polyethylene terephthalate and the like, a non-crystalline polymer such as polysulfon, polyether sulfon, polyallilate and so on, polyolefin such as polyethylene, polypropylene and so on, polyamide such as polycarbonate, nylon and so on, can be listed. Among them, monoaxially oriented polyethylene terephthalate, polyether sulfon, polycarbonate and so on are especially favorable.

Two sheets of the resin film substrates can be the same material with each other, or can be of a different material, but it is preferable to provide a transparent electrode on the substrate in use.

The use of resin film as a substrate of a liquid crystal cell can reduce the weight of the shutter portion when compared with the weight of the cell for which glass is used, and the flexibility of the resin film ensures safety so as not to fracture when receiving impact as occurs in the case of glass. In addition, in the case of resin film substrate, as a production method of the cell, material for the liquid crystal is continuously coated on a long length substrate film and the coated substrate is laminated with the other confronting substrate. Therefore, when compared with the production method using a vacuum injection method for the conventional glass cell, a production method which is easy to upsize a cell and is excellent in productivity can be adopted. Consequently, a large cell having the size of more than 14 inches can be easily materialized, which is technically and economically difficult to be put into practical use with the conventional liquid crystal panel.

In the construction shown in FIG. 1, a liquid crystal shutter 17 is formed of combination of linear polarizer 12 with a liquid crystal cell 13, and the liquid crystal shutter 17 is disposed in front of the CRT as a display device.

For the polarized glasses, a normal linear polarizer is used. Since an image for the left eye and an image for the right eye are separated by the polarized glasses, the right and left polarization axes are in different directions from each other. The best separation is obtained when the polarization axes of the right and left glasses differ from each other by an angle of 90 degrees.

In the construction of the present invention, use of polarizer glasses whose polarizing directions differ in right and left sometimes makes a great difference in the hue of the image observed through the right and left glasses. In order to prevent the phenomenon, at least in front or in the rear of the liquid crystal cell, a retardation plate 23 can be laminated to correct the hue. The suitable retardation plate is selected in accordance with the optical charasteristics of the liquid crystal cell from a number of the retardation plates sold on the market.

In the present invention, by preparing two or more pairs of aforementioned polarized glasses, one display device can be observed with plural persons at the same time. And since the polarized glasses are just like sunglasses when not in use for the display, the glasses can be used for a long period with few discomfort.

It is preferable in the present invention that the ferroelectric liquid crystal contains more than 10 wt % of a ferroelectric liquid crystal polymer.

An ordinary ferroelectric liquid crystal can be used as a liquid crystal, it is preferable to add more than 10 wt % of a ferroelectric liquid crystal polymer. By this addition, the film forming ability during production can be improved and the orientation of the produced cell is mechanically stabilized.

There is no upper limit for the mixing ratio, provided that there is no hindrance on the speed of response. In general, the high speed response can be more sufficiently obtained with an ordinary ferroelectric liquid crystal polymer than with a nematic type liquid crystall.

In the present invention, it is desirable that the display device has a display size of more than 14 inches.

The liquid crystal cell has a construction according to the present invention, therefore it is possible to apply to a large sized display, which can not be materialized with the conventional glass liquid crystal cell.

In the present invention, it is preferable that a polarizer is disposed between the display device and the liquid crystal shutter, and the retardation of the liquid crystal cell is preferably more than 0.2 $\mu$m.

By making the retardation of the liquid crystal cell to be more than 0.2 $\mu$m, the actual cell thickness can be relatively thicker so that the yield of the cell production can be improved. But in general, as the retardation becomes bigger, color on the display observed through the polarizer gets tinted.

In the construction shown in FIG. 1, the liquid crystal shutter 17 is used as a refraction type, the hues seen through the left and right eyes sometimes slightly differ in accordance with the retardation. In such a case, spectral characteristics which compensate the right and left visibilities may be given to the polarizer 12. To change the mixing rate of the colors used for the polarizer, to laminate a thin color compensation filter, and others are cited as a specific method. Or, a retardation plate may be disposed to any one of right or left polarizers on the surface of the display device.

In the present invention, the liquid crystal shutter can be composed of a guest-host type which contains a dichroic coloring agent in the liquid crystal.

A guest-host type liquid crystal cell can be composed of by a mixture of a dichroic coloring agent to a liquid crystal. Though anything suitably selected from products on the market can be used as the dichroic coloring agent, it is preferable to use a black dichroic coloring agent, when the original tone of the color on the display image of the display device is desired to reproduce with fidelity. The mixing amount is not particularly limited, but since the thickness of the cell is thin in the case of a ferroelectric liquid crystal cell, a good contrast can be normally obtained by mixing about 1 to 5 wt %.

As shown in FIG. 2, when the liquid crystal shutter 17 is in a guest-host mode, there is no need to provide the polarizer 12. The liquid crystal shutter 17 serves to switch the polarizing direction through a change of sign of the driving voltage so that the viewer can recognize a three-dimensional image only by wearing the polarized glasses 14 which have different polarizing directions in the right and left.

On the other hand, as shown in FIG. 3, when the liquid crystal shutter 17 is used in a refraction mode, a film 22 which has refraction is disposed in front of the guest-host type liquid crystal cell 13. By this procedure, the viewer can obtain on-off of the display color in accordance with the retardation of the refraction film 22, so that the viewer can recognize a three-dimensional image. There is no particular limitation to the quality of the material for the refraction film 22, but an ordinary monoaxially oriented resin film is suitable because of its cheapness. The resin film can be used in a wide range of retardation of 0.1 to 0.4 $\mu$m.

In the present invention, it is preferable that the retardation plate is disposed at least either in front of or in the rear of the liquid crystal cell.

When polarized glasses having different polarizing direction in the right and left are used, the difference in hue of the image seen through the right and left glasses becomes great. In order to prevent the phenomenon, the retardation plate is disposed at least either in front of or in the rear of the liquid crystal cell so that the hue difference in the right and left can be compensated. The retardation plate can be selected in accordance with the optical characteristics of the liquid crystal cell from many plates on the market.

In the present invention, the display device is preferably any one selected from CRT, a liquid crystal panel, a plasma display, an EL panel, and LED.

These are concrete examples of the display devices and it is not limited to these examples.

In the present invention, it is preferable that the switching of the display image is detected on the display screen, voltage waveform generating means which generates voltage waveforms to switch the liquid crystal shutter in response to the detection result is provided, and the liquid crystal shutter is operated in synchronization with the image switching of the display device by the voltage waveform generating means. Usually, the liquid crystal shutter may be operated in direct timing with the control signal of the display, but the method according to the present invention can be cited as a method in which entirely no work is applied on the display itself.

That is, in the display, though the image for the left eye and the image for the right eye are switched at high speed as described before, a mark is put on a portion of the image. For instance, a small white colored circle for the image for the left eye, and a small black colored circle for the image for the right eye are displayed on a portion of the image. When, for instance, a photo-sensor such as a photo-diode is fixed to the mark position on the screen, a switching signal in response to switching of the actual image can be prepared. The sensor may be directly fixed on a panel which becomes the screen by means of a sucker and the like, or it may be fixed on a portion of the liquid crystal shutter. By this process, it becomes possible to generate a switching signal to drive the liquid crystal shutter without any work on a display itself such as CRT and the like. Since the response of the ferroelectric liquid crystal has an extremely high speed compared with the conventional nematic type liquid crystal, there virtually occurs no time lag.

The above described construction is for achieving the second object. In order to achieve the first object, a construction as follows is adopted.

In a three-dimentional display which has: a display device to alternatively display the image for the right eye and the image for the left eye in division of the images at predetermined time period; a liquid crystal shutter which works for switching a linear polarization with an elliptical polarization in synchronization with an image switching of the display device; and polarized glasses which have different polarization characteristics in the right and left, and serve to observe an image transmitted through the liquid crystal shutter as a three-dimensional image, the present invention is characterized in that a retardation plate which compensates an elliptical polarization is disposed on the display device side of the polarized glasses, and the retardation plate is configured to have a condition of $|\Delta n_1 d_1 - \Delta n_2 d_2| \leq 50$ nm in the range of light wavelength from 400 through 900 nm, for the retardation ($\Delta n_1 d_1$) of the retardation plate and a retardation ($\Delta n_2 d_2$) of a liquid crystal cell which forms the aforementioned liquid crystal shutter. Here, $\Delta n_1$ is refractive index anisotropy, $d_1$ is thickness of the retardation plate, $\Delta n_2$ is refractive index anisotropy of liquid crystal layer of the liquid crystal cell, and $d_2$ is thickness of the liquid crystal layer of the liquid crystal cell.

When a liquid crystal such as a ferroelectric liquid crystal, a chiral smectic liquid crystal are used as a liquid crystal for the liquid crystal shutter, switching of polarization by applying electric voltage is usually to switch a linear polarization with an elliptical polarization. Therefore, in order to compensate the elliptical polarization and obtain a high contrast, a retardation plate is provided at least on either one of the right and left polarizers of the polarized glasses. Paying attention to the fact that both retardation plate and liquid crystal cell have wavelength dependency of retardation, extremely high contrast can be materialized by using a retardation plate in which the residual retardation as an absolute value of difference between both retardations satisfies the aforementioned condition over all range of visible rays (400 to 900 nm).

Incidentally, a nominal value of retardation of the retardation plate sold on the market generally uses a value measured at a green color (550 nm).

It is preferable that the alternative display speed of the aforementioned display device is high enough for the viewer not to feel flickering. More specifically, when the speed is more than 30 Hz, the flickering can not be recognized. Therefore, it is preferable to have a display device that is able to switch images at high speed of more than about 30 Hz.

As concrete examples of display devices, a CRT (Cathode Ray Tube), liquid crystal panel such as TFT(Thin Film Transister) and so on, plasma display, EL (Electro Luminescence) panel, LED (Light-Emitting Diode) and others can be cited.

In the present invention, it is preferable that a liquid crystal cell having the liquid crystal shutter is any one of a ferroelectric liquid crystal cell, an antiferroelectric liquid crystal cell, or a chiral smectic A liquid crystal cell showing an electric field inductive tilt.

Among them, it is preferable to use the ferroelectric liquid crystal. By using the ferroelectric liquid crystal, a three-dimensional display through which high speed response becomes possible and which can easily respond to a moving image.

Among the ferroelectric liquid crystals, the one containing a ferroelectric liquid crystal polymer is desirable, and by using this, production of a liquid crystal cell using a plastic film base becomes easy. As concrete examples of the ferroelectric liquid crystal polymer, acrylate main chain series polymer liquid crystal, methacrylate main chain series polymer liquid crystal, chloroacrylate main chain series polymer liquid crystal, oxirane main chain series polymer liquid crystal and so on can be cited. A reinforcing material such as a thermoplastic resin, and a cross-linkable resin and so on or a spacer such as glass or plastic can be mixed to the ferroelectric liquid crystal polymer.

The liquid crystal shutter serves to switch the polarization state into two states by switching the sign of applied electric voltage.

The liquid crystal cell which is to serve as the liquid crystal shutter is constructed of a ferroelectric liquid crystal is held between two sheets of plastic film substrates having electrodes.

The material for the plastic film substrate are, for instance, a crystalline polymer such as monoaxially, biaxially oriented polyethylene terephthalate and so on, a non-crystalline polymer such as polysulfon, polyether sulfon, polyallilate and so on, polyolefin such as polyethylene, polypropylene and so on, polyamide such as polycarbonate, nylon and so on. Among them, monoaxially oriented polyethylene terephthalate, polyether sulfon, polycarbonate and so on are especially favorable.

Two sheets of the resin film substrates can be the same material with each other, or can be of a different material, but it is preferable to provide a transparent electrode on the substrate in use.

The use of plastic film as a substrate of a liquid crystal cell can reduce the weight of the shutter portion when compared with the weight of the cell for which glass is used, and the flexibility of the plastic film ensures safety so as not to fracture when receiving impact as occurs in the case of glass. In addition, in the case of plastic film substrate, as a production method of the cell, material for the liquid crystal is continuously coated on a long length substrate film and the coated substrate is laminated with the other confronting substrate. Therefore, when compared with the production method using a vacuum injection method for the conventional glass cell, a production method which is easy to upsize a cell and is excellent in productivity can be adopted. Consequently, a large cell having the size of more than 14 inches can be easily materialized, which is technically and economically difficult to be put into practical use with the conventional liquid crystal panel.

In the present invention, it is preferable that the retardation plate is constructed by laminating at least two transparent materials which are different in wavelength dependence of the refractive index.

Since the wavelength dependence of the retardation plate is determined by the quality of the material, the compensation of the wavelength of the liquid crystal cell over all area of visible rays (400 nm to 900 nm) is sometimes uncompensatable if only one kind of phase different plate is used. So, by combining more than two kinds of retardation plates having different wavelength dependence from each other, the wavelength dependence of the retardation plate as a whole can be made closer to the wavelength of the liquid crystal cell.

In the present invention, it is desirable that the retardation plate is a liquid crystal cell constructed in a manner that the liquid crystal is held between glass or plastic substrate.

The material of the substrate may be any one of glass or plastic, but it is preferable to use a plastic film having flexibility. The material of the liquid crystal can be the same as that of the liquid crystal shutter.

In the present invention, it is desirable that the liquid crystal cell composing the retardation plate is the same as the liquid crystal cell composing the liquid crystal shutter.

By making the liquid crystal cell of the retardation plate the same as the liquid crystal cell of the liquid crystal shutter, the most idealized state can be obtained since $|n_1 d_1 - \Delta n_2 d_2| \approx 0$ can be achieved.

In achieving the first object or the second object described above, it is desirable to be able to avoid reflection of the outside light which hinders visivility.

In the present invention, it is desirable to provide an antireflection film to prevent the reflection of the outside light which hinders eye-recognition on the viewer side surface of the liquid crystal shutter.

As the antireflection film, an antireflection film which optically prevents the reflection by laminating thin films which have different refraction, an antiglare film which prevents virtual reflection through diffusing the direction of the reflection ray with forming microscopic asperities, or the combination of these films can be listed.

These antireflection films can be directly formed on the transparent substrate which holds the liquid crystal layer of the liquid crystal shutter. Or a transparent film and a transparent backing plate such as a transparent acrylate board on which the antireflection film is formed, may be separately disposed on the viewer side of the liquid crystal shutter. The transparent film or the transparent board on which these antireflection films are formed can be easily available from commercial products. For instance, "CLAREX NON-GLARE" manufactured by NITTO JUSHI KOGYO Co., Ltd, "SINKOLITE" manufactured by MITSUBISHI RAYON Co., Ltd., "SUMIPEX" manufactured by SUMITOMO CHEMICAL Co., Ltd, and others can be listed.

DETAILED DESCRIPTION OF THE PREFERRED EMBODIMENT(S)

(A First Embodiment)

Figure 1:
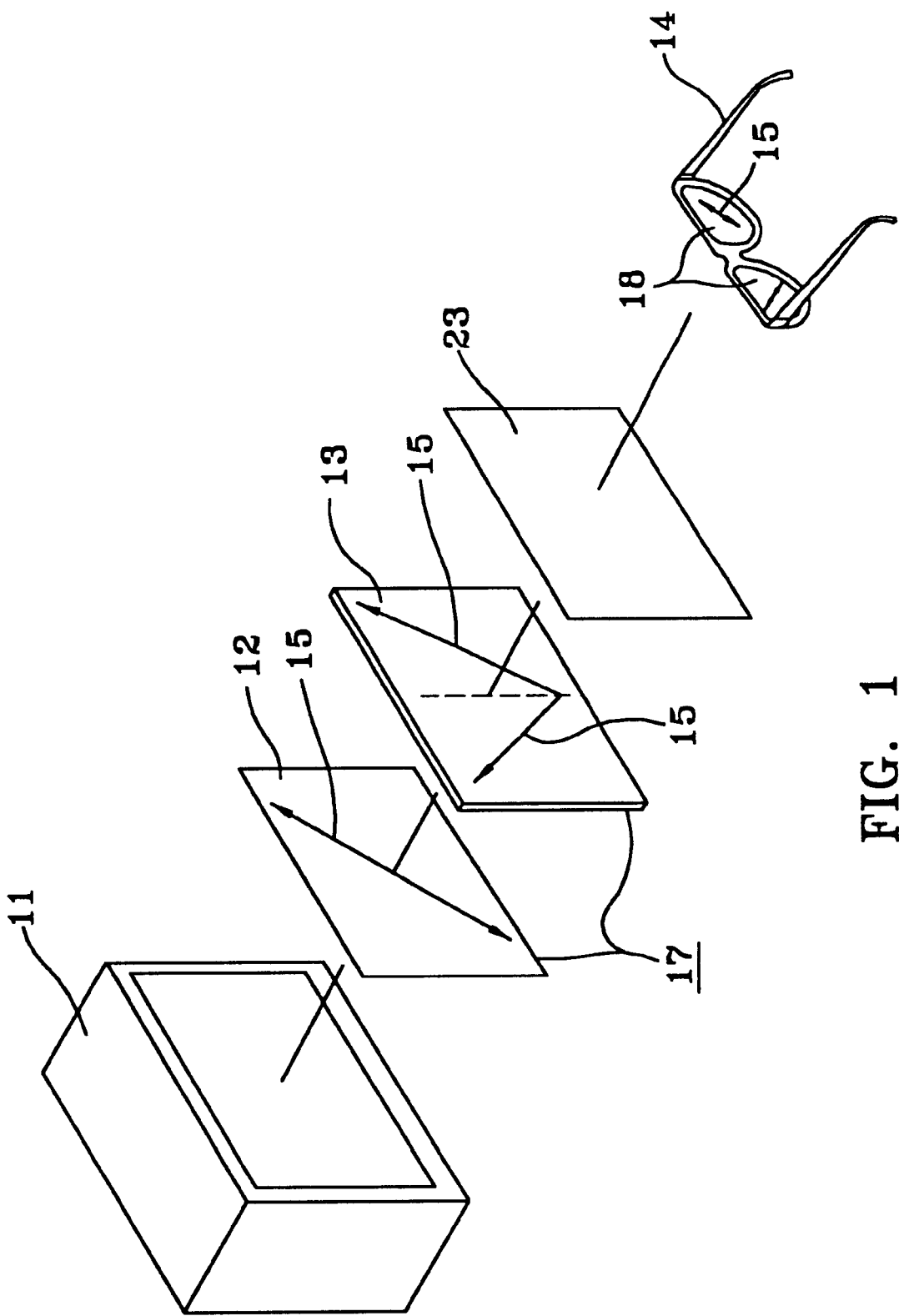
FIG. 1 is a perspective view showing a first example and a first embodiment of a three-dimensional display according to the present invention.
Figure 2:
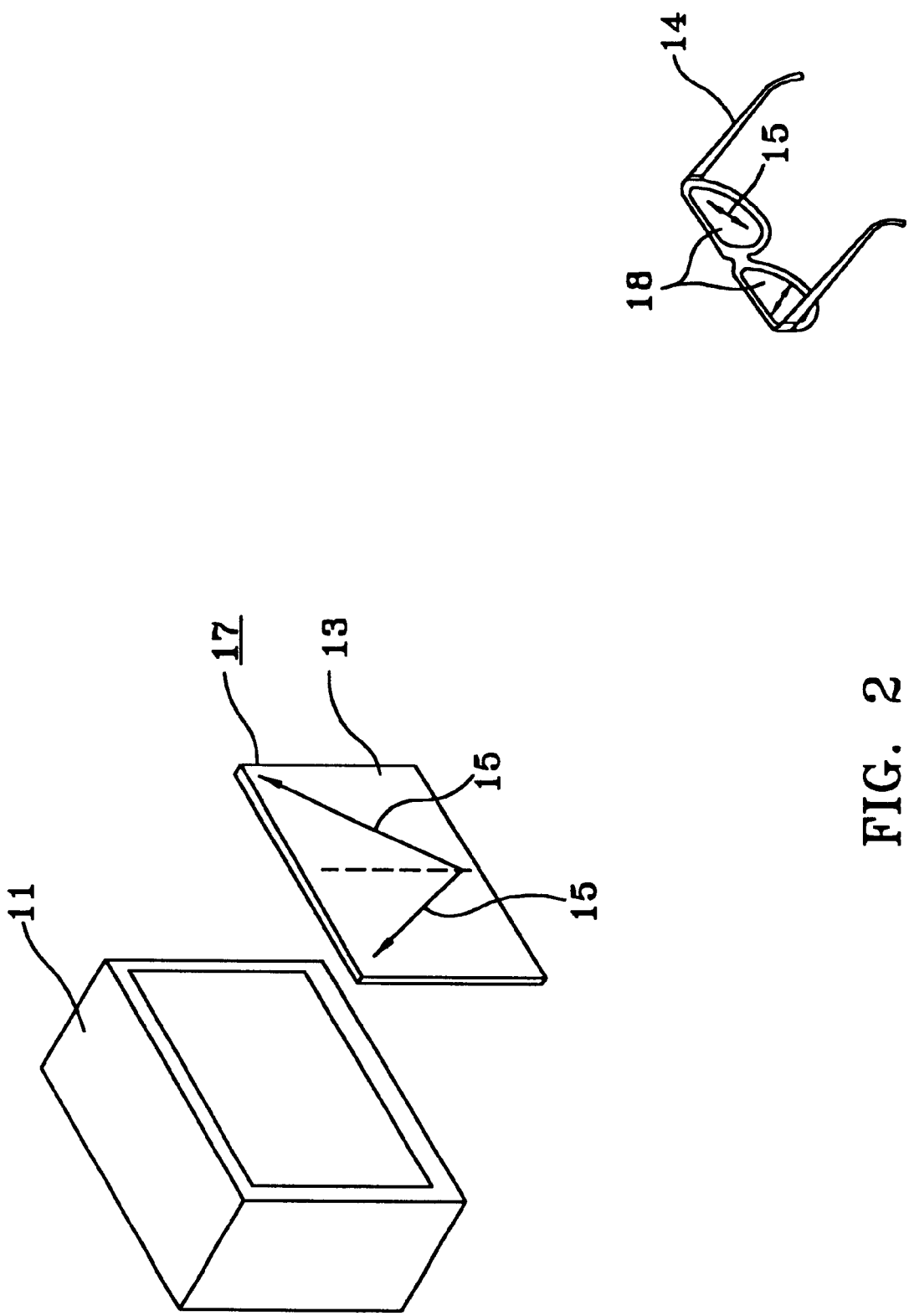
FIG. 2 is a perspective view showing a second example and a first embodiment of a three-dimensional display according to the present invention.
Figure 3:
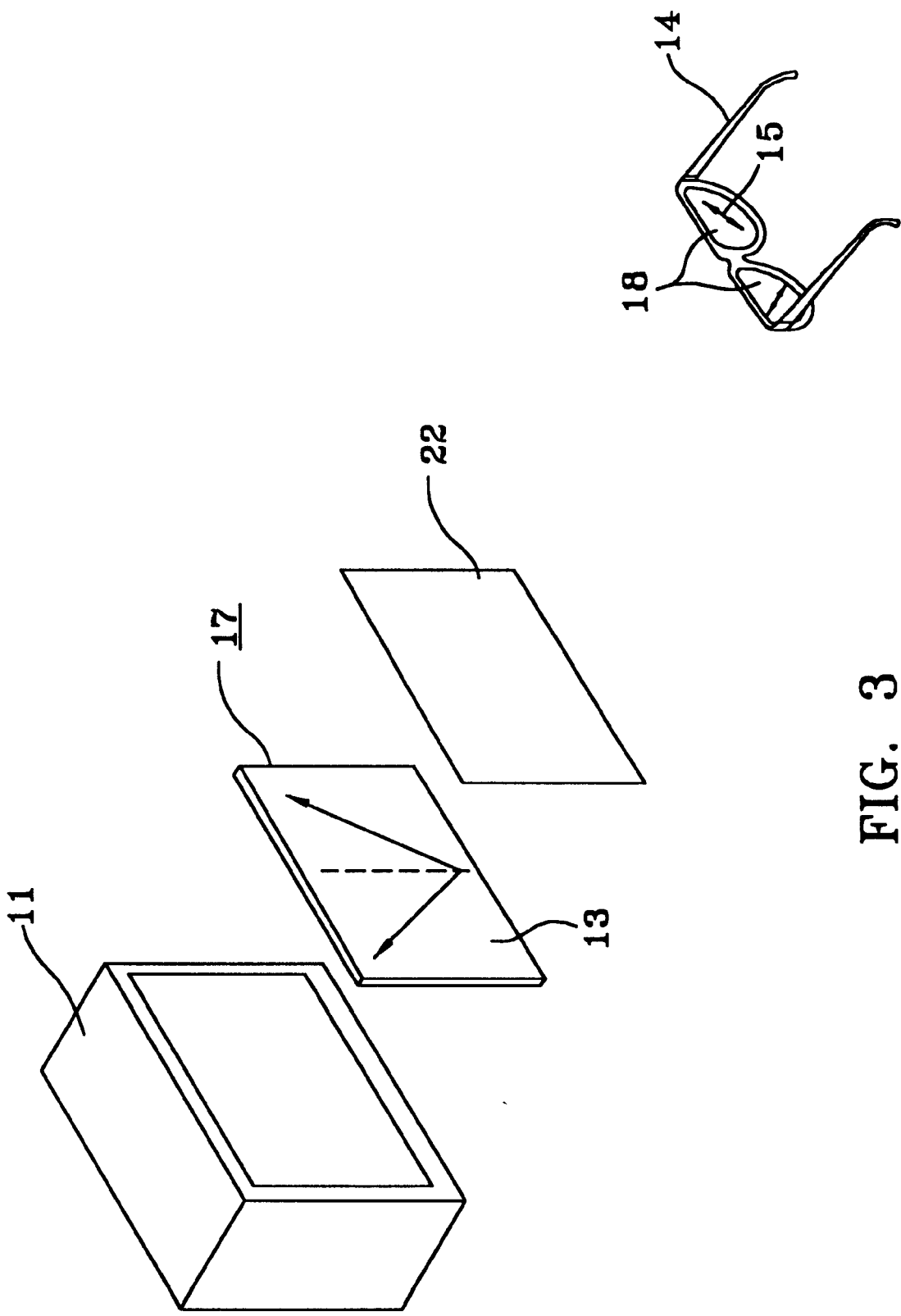
FIG. 3 is a perspective view showing a third example and a first embodiment of a three-dimensional display according to the present invention.

A three-dimensional display according to the first embodiment of the present invention will be now explained with reference to FIG. 1.

The three-dimensional display is composed of: a CRT 11 (Cathode Ray Tube) as display device; a linear polarizer 12 disposed in front of the CRT 11; a liquid crystal cell 13 disposed in front of the linear polarizer 12; and polarized glasses 14. Between the CRT 11 and the liquid crystal cell 13, there provided with a shutter driving circuit (not shown) which switches the polarizing directions 15 synchronizing with the switching of images of the aforementioned display device. In this embodiment, a liquid crystal shutter 17 is defined by the linear polarizer 12 and the liquid crystal cell 13, and these linear polarizer 12 and the liquid crystal cell 13 are closely adhered to a panel face of the CRT 11.

The size of the screen of the aforementioned CRT 11 is more than 14 inches and an image for the right eye and an image for the left eye are alternatively displayed in division of the images at predetermined time period.

The aforementioned linear polarizer 12 linearly polarizes a image light emitted from the CRT 11.

The aforementioned liquid crystal cell 13 is structured of a ferroelectric liquid crystal containing more than 10 wt % of a ferroelectric liquid crystal polymer held between two sheets of resin film substrates.

The ferroelectric liquid crystal is the aforementioned (a), (b), (c) and so on. The material for a resin film substrate is monoaxially or biaxially oriented polyethylene terephthalate, polysulfone, polyether polysulfone, and the like.

A group of liquid crystal driving electrodes are formed on the two resin film substrates of the liquid crystal 13. There is no limitation for this electrode group provided that the material has conductivity, but it is preferable to use material having both conductivity and transparency at least for one electrode. More concretely, it is preferable to use a transparent electrode such as indium oxide or ITO film (Indium Tin Oxide) consisting of a mixture of indium oxide and tin oxide.

There is no special limitation for forming a liquid crystal driving electrode on a resin film substrate, and the conventionally well known evaporation method and sputtering method can be used for forming the electrode. An orientation control film is not necessarily required to be disposed on the electrode. An insulating film can be provided to prevent electrical continuity, if necessary.

The aforementioned polarized glasses 14 are provided with polarizers 18 whose polarizing directions 15 differ in a manner that the right and left polarizing directions 15 are the same directions as switching directions of each of the liquid crystal cells 13.

In the present display, an image ray emitted from the CRT 11 is linearly polarized by a linear polarizer 12, and then converted into a two polarized state by the liquid crystal shutter 17 in division of the images at predetermined time periods. The viewer can recognize a pseudostereoscopic image by wearing the polarized glasses 14 so that different images can be observed with the right eye and the left eye respectively.

The surface of the liquid crystal cell 13 on the polarized glasses 14 side is formed with an antireflection film consisting of an antireflection membrane or an antiglare membrane or the combination thereof so that the reflection of the outside light which hampers the visivility of the viewer who wears the polarized glasses 14. The antireflection film is formed by using a film with an antireflection film formed on the surface thereof as a transparent film substrate for the liquid crystal cell 13, or by adhering a transparent film on which an antireflection film is separately formed.

(A Second Embodiment)

Figure 4:
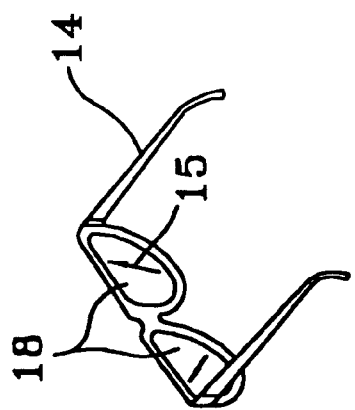
FIG. 4 is a perspective view showing a fourth example and a second embodiment of a three-dimensional display according to the present invention.
Figure 4:
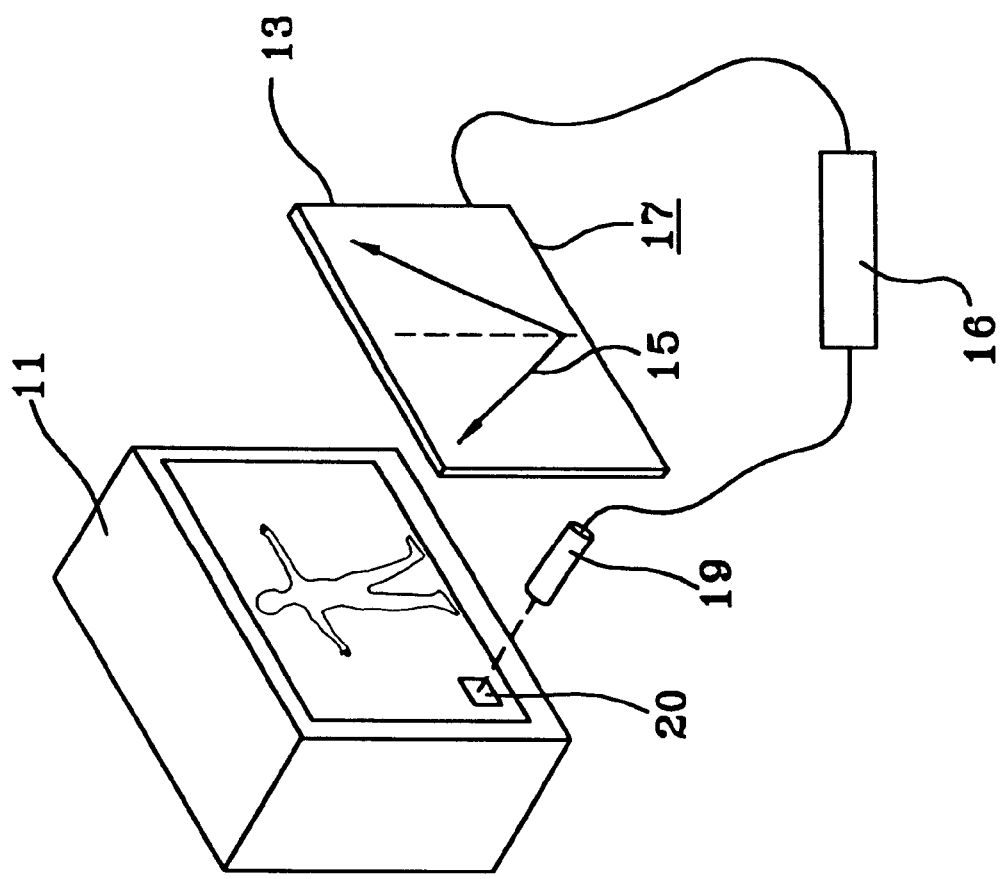

As shown in FIG. 4, a three-dimensional display according to the present embodiment is composed of providing the CRT 11 as a display device, a guest-host type liquid crystal cell 13 as the liquid crystal shutter 17 disposed in front of the CRT 11, the shutter driving circuit 16, and the polarized glasses 14.

On a panel for a screen of the CRT 11, a photo-diode 19 which serves as a photo-sensor is fixed with a sucker and the like. A mark 20 for the image for the left eye and right eye is displayed at the position corresponding to the photo-diode on the image.

The aforementioned shutter driving circuit 16 detects the aforementioned mark 20 with the photo-diode 19 and supplies a switching signal displayed in accordance with the switching of the image to the liquid crystal shutter 17.

The aforementioned guest-host type liquid crystal cell 13 is composed of a ferroelectric liquid crystal mixed with a bichroic coloring agent, which is held between two sheets of resin film substrates.

Other components such as the polarized glasses 14 and the like in the present embodiment are the same as those in the first embodiment.

(A Third Embodiment)

Figure 5:
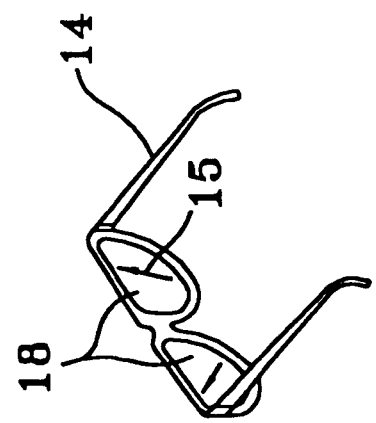
FIG. 5 is a perspective view showing a fifth example and a third embodiment of a three-dimensional display according to the present invention.
Figure 5:
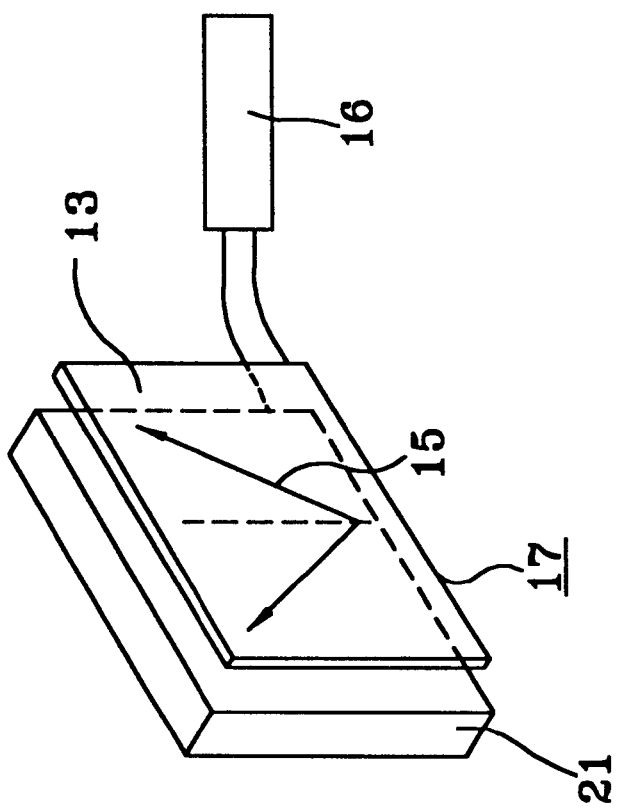

As shown in FIG. 5, a three-dimensional display according to the present embodiment is composed of a plasma display 21 which serves as a display device, the guest-host type liquid crystal cell 13 which serves as a liquid crystal shutter 17 disposed in front of the plasma display 21, the shutter driving circuit 16, and the polarized glasses 14.

Other components such as the polarized glasses 14 and the like in the present embodiment are the same as those in the first and the second embodiments.

EXAMPLE 1

In the above described first embodiment, a three-dimensional display according to the present example is assembled with the specific condition as follows.

A dichloromethan solution is prepared, the dichloromethan solution containing 20 mass weight percent of 95 weight percent of low molecular weight ferroelectric liquid crystal having a chemical structure shown by the following chemical constitutional formula 26 and a phase transfer temperature shown by a phase transition diagram 1, 4.8 weight percentage of polymethyl methacrylate (PMMA) having an number average molecular weight 3000, and 0.2 weight percentage of a spherical silica spacer having 2.2 μm particle diameter. The solution is coated on a polyether sulfone (PES) film substrate (trade name FST, manufactured by SUMITOMO BAKELITE Co., Ltd. on the ITO electrode surface side with a gravure coater. (Chemical constitutional formula 26)

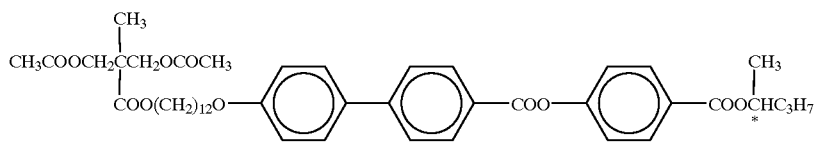

(Phase Transition Diagram 1)

$$\text{Iso} \xrightarrow[83]{83} \text{SmA} \xrightarrow[60]{60} \text{SmC}^* \xrightarrow[5]{5} \text{g (° C.)}$$

Soon after the solvent is dried, the coated substrate and another substrate of the same kind are laminated with a pair of laminate rollers and the laminated substrates are cut out in a size of 210 mm×280 mm. Next, while applying a rectangular voltage of ±40V, 20 Hz between the electrodes of both substrates, a minute shear stress of uniform deflectional deformation is given to the whole panel to perform a monoaxial horizontal orientation treatment.

The retardation value of the liquid crystal cell 13 thus prepared is measured to be 320 nm.

As shown in FIG. 1, since the tilt angle θ of the liquid crystal is about 30 degrees at room temperature, the polarization axis of the linear polarizer is in the direction having the tilt angle of 30 degrees. The polarization axis of the polarized glasses is adjusted in the direction that the right eye is in the same direction as that of the linear polarizer and the left eye is in the direction perpendicular to the above direction.

These polarizers are all black colored polarizer 92-18 manufactured by SANRITZ Corp. The screen size of the CRT is 17 inches.

First, without using a retardation plate, the CRT and the liquid crystal shutter are synchronized by a personal computer and operated, a pseudostereoscopic image can be recognized through the polarized glasses. With regard to the way to come in sight through right and left, though it looks a little yellowish through the left eye and a little bluish through the right eye, the tone of the color is natural when looking through both eyes.

Next, a retardation plate (manufactured by NITTO DENKO CORPORATION) as the linear polarizer 12 having a retardation of 200 nm is disposed in front of the liquid crystal cell 13 so that the optical main axis stays horizontal, then each image through the right and left eyes nearly matches in hue and a more natural three-dimensional display can be materialized.

Moreover, the panel surface of the CRT 11 is curved with an arc-shaped cross section, but as the liquid crystal shutter 17 itself is made of a film, the liquid crystal shutter 17 can be disposed closely contacting on the panel surface of the CRT 11, so that the light loss due to interfacial reflection does not occur and the visibility is excellent.

EXAMPLE 2

In the above described second embodiment, a three-dimensional display according to the present example is assembled with the specific condition as follows.

Material of a liquid crystal for the liquid crystal cell contains a ferroelectric liquid crystal polymer having a structure shown by a chemical constitutional formula 27 written below (number average molecular weight Mn=3100), a low molecular weight ferroelectric liquid crystal having a structure shown by a chemical constitutional formula 28, and a dichroic coloring agent (manufactured by NIPPON KANKOH-SHIKISO KENKYUSHO Co., Ltd., trade name NKX-1033), at the rate of 15 wt %, 83 wt % and 2 wt %, respectively. The phase transfer temperature of the liquid crystal is shown in a phase transition diagram 2.

(Chemical Constitutional Formula 27)

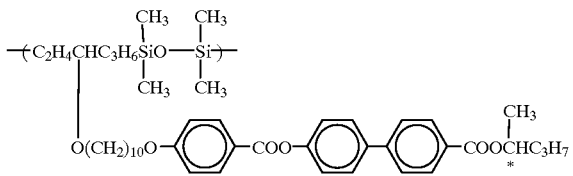

(Chemical Constitutional Formula 28)

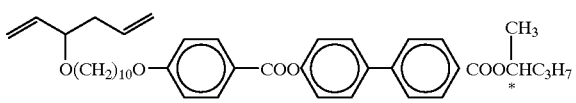

(Phase Transition Diagram 2)

$$I \xrightarrow[96]{} \text{SmA} \xrightarrow[93]{} \text{SmC}^* \xrightarrow[20]{} \text{g (° C.)}$$

Aceton solution containing 20 wt % of the above liquid crystal is prepared and coated to the same substrate as that in the example 1 on the electrode side with a gravure coater, and a liquid crystal film having a thickness of 4 μm is produced.

Next, after a substrate confronting the above substrate is laminated together and is cut out into a size of 400 mm×500 mm and a monoaxial horizontal orientation treatment is done by giving it a bending deformation in one direction with an iron roller having a diameter of 50 mm while applying a rectangular voltage of ±50V, frequency 10 Hz. The retardation value with a spectrograph is 610 nm.

The screen size of the CRT of the present example is 21 inches.

In order to synchronize the image of the display with the movement of the liquid crystal shutter, a marker 20 is displayed on a portion of the display image and the flickering of the marker is detected with a photodiode 19 to perform an on-off operation of the liquid crystal shutter 17.

When observing the image through the polarized glasses 14, a real three-dimensional image can be recognized. No difference between the right and the left hue can be seen.

EXAMPLE 3

In the third embodiment, a three-dimensional display according to the present example is prepared, wherein a specific condition is as follows.

The screen size of the plasma display 21 is 42 inches. And the size of the liquid crystal cell 13 is 65 cm×86 cm.

When driving while changing the sign of the applied voltage to the liquid crystal shutter 17 in synchronization with the image switching of the plasma display 21, a clear and sharp three-dimensional image without a sense of incompatibility can be recognized.

Additionally, since the liquid crystal cell 13 is constructed of a ferroelectric liquid crystal cell held between two sheets of plastic film substrates, it is shown that it can be applied to the large size plasma display 21, which can not be materialized with a conventional glass liquid crystal cell.

Furthermore, since the polarized glasses 14 can be made of only the polarizer 18, the structure is simple.

(A Fourth Embodiment)

Figure 6:
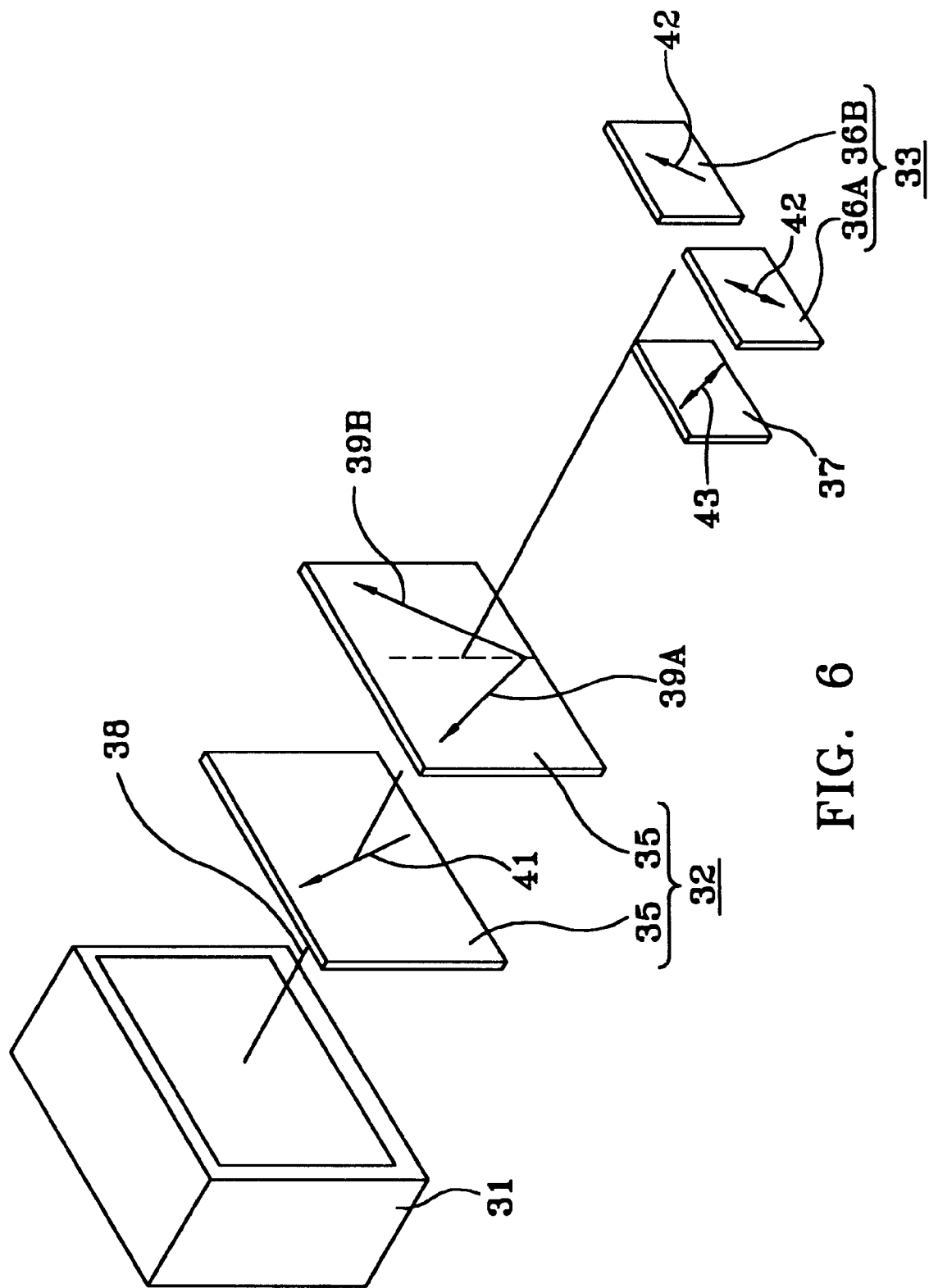
FIG. 6 is a perspective view showing a sixth example and a fourth embodiment of a three-dimensional display according to the present invention.

Referring to FIG. 6, a three-dimensional display according to an embodiment of the present invention will be explained. This three dimentional display comprises a CRT (Cathode Ray Tube) as a display device, a liquid crystal shutter 32 provided in front of the CRT 31 in intimate contact, polarized glasses 33 and a retardation plate 37 placed on the CRT 31 side of the polarized glasses 33.

The liquid crystal shutter 32 is defined by a linear polarizer 34 opposedly placed to the CRT 31, and a liquid crystal cell 35 placed in front of the linear polarizer 34. The liquid crystal cell 35 is composed of the liquid crystal cell held between two sheets of plastic film substrates having electrodes.

As for the liquid crystal, a high-speed response liquid crystal is used which is any one of a ferroelectric liquid crystal cell, an antiferroelectric liquid crystal cell or a chiral smectic A liquid crystal showing field inductive tilt. It is preferable for the liquid crystal to contain more than 10 wt % of a ferroelectric liquid crystal polymer so that production of the liquid crystal cell becomes easy.

Material for the plastic film substrate is selected from the group consisting of monoaxially or biaxially oriented polyethylene terephthalate, polysulfon, polyether sulfon and so on. On the two sheets of plastic film substrates of the liquid crystal cell 35, an electrode for driving the liquid crystal is formed. Between the CRT 31 and the liquid crystal cell 35, a driving circuit for the shutter (not shown) is provided, which alternately switches two orientation directions 39A and 39B of the liquid crystal in synchronization with image switching of the CRT 31.

On the surface of the liquid crystal cell 35 on the polarized glasses 33 side, an anti-reflection film which is defined by an anti-reflection membrane or anti-glare membrane or the combination thereof, is formed so that the reflection of outside light which interferes the eye-recognition of a viewer who wears the polarized glasses 33 can be prevented. The formation of the anti-reflection film is carried out by using a film with an anti-reflection membrane formed as a transparent film substrate constructing the liquid crystal cell 35 on the surface thereof, or by adhering a transparent film on which an anti-reflection membrane is separately formed.

The polarized glasses 33 are composed of a polarizer 36A for the left eye and a polarizer 36B for the right eye. A retardation plate 37 is placed on the CRT 31 side of the polarizing 36A for the left eye.

The retardation plate 37 is designed in a manner that residual retardation ($|\Delta n_1 d_1 - \Delta n_2 d_2|$) is less than 50 nm for the retardation ($\Delta n_1 d_1$) of the retardation plate 37 over all light wavelength from 400 through 900 nm and the retardation ($\Delta n_2 d_2$) of the liquid crystal cell 35 forming the liquid crystal shutter 32.

This sort of retardation plate 37 can be prepared by, for instance, laminating at least two kinds of transparent materials which differ in wavelength dependence of the refractive index with each other.

Or, it can be a cell construction in which the liquid crystal is held between glass or plastic substrates. In this case, in order to make $|\Delta n_1 d_1 - \Delta n_2 d_2|$ nearly zero, it is preferable to use the liquid crystal cell for the retardation plate 37 which is the same as the liquid crystal cell 35 of the liquid crystal shutter 32.

In this three-dimensional display, the CRT 31 alternatively displays images for the right eye and images for the left eye in division of the images at predetermined time period, the linear polarizer 34 linearly polarizes the image beams emitted from the CRT 31 in the direction along the polarization axis 41.

In the liquid crystal cell 35 of the liquid crystal shutter 32, the liquid crystal molecules can take in the two oriented directions 39A and 39B having tilt angle θ by the applied voltage.

When the liquid crystal molecule faces in one orientation direction 39A, a beam of light 38 transmitted through the liquid crystal shutter 32 is changed into a linearly polarized light. Since the light 38 is linearly polarized, it transmits the polarizer 34 and the liquid crystal cell 35 having same polarization direction, but is blocked off by the polarizer 36B having different polarization direction, thus "dark pattern" is displayed on the right-eye side. On the other hand, in the left eye side, in addition to the above described construction in the right eye side, the retardation plate 37 having a optical main axis direction which is not parallel to a direction of the polarization axis 42 of the orientation plate 36A is further disposed, light 38 having a spectrum equivalent to the retardation ($\Delta n_1 d_1$) transmits to change into "bright pattern" display. In this circumstance, the intensity I of the transmitted light 38 is shown as I sin2 ($\pi \cdot \Delta n_1 d_1 / \lambda$).

Next, when the liquid crystal molecule faces in the other orientation direction 39B, a light transmitted through the liquid crystal shutter 32 changes into an elliptical polarization through the retardation ($\Delta n_2 d_2$) of the liquid crystal cell. In the right eye side, since the liquid crystal cell of which orientation direction is not parallel to the polarization axial direction 41, is held between the polarizers 34 and 36B of which orientation directions intersect with each other at a right angle, light 38 having a spectrum equivalent to the retardation ($\Delta n_2 d_2$) transmits to be changed into "bright pattern" display.

On the other hand, in the left eye side, since the direction of the optical main axis 43 of the retardation plate 37 is placed to be perpendicular to the other orientation direction 39B of the liquid crystal shutter 32, light 38 having a spectrum equivalent to the retardation $|\Delta n_1 d_1 - \Delta n_2 d_2|$ comes to transmit. However, the retardation plate 37 of the present embodiment is designed to be in conformity with the condition of $|\Delta n_1 d_1 - \Delta n_2 d_2| \leq 50$ nm for the retardation ($\Delta n_1 d_1$) of the retardation plate 37 and the retardation ($\Delta n_2 d_2$) of the liquid crystal cell 35 of the liquid crystal shutter 32, the intensity of the transmitted light becomes smaller to display substantially "dark pattern".

A viewer observes different images through the right and left eyes with the polarized glasses 33 so that the viewer can artificially recognize the three-dimensional image.

EXAMPLE 4

In the fourth embodiment, a three-dimensional display according to the present example is prepared using the concrete condition as follows.

A dichloromethane solution containing 20 mass percentage of solute composed of 95 wt % of ferroelectric liquid crystal having a structure of the chemical constitutional formula 29 written below and a phase transfer temperature shown in a phase transition diagram 3, 4.9 wt % of polymethyl methacrylate (PMMA) having a number average molecular weight 3000, and 0.1 wt % of a spherical silica spacer having a diameter of 2.1 μm, is prepared. The solution is coated by means of a gravure coater on a ITO electrode surface side of a polyether sulfon (PES) film substrate ( trade name FST, manufactured by SUMITOMO BAKELITE CO., Ltd.) with ITO electrode.
(Chemical Constitution Formula 29)

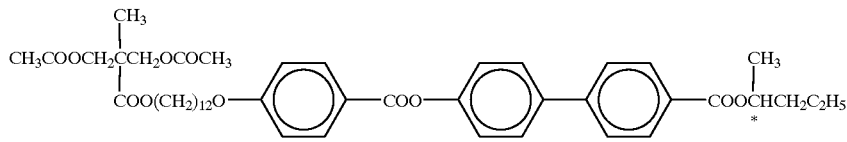

(Phase Transition Diagram 3)

$$\text{Iso } \frac{107}{105} \text{ SmA } \frac{96}{95} \text{ SmC}^* \frac{-2}{-5} \text{ Cryst } (°C)$$

Soon after the solvent is dried, the coated substrate and another substrate of the same kind are laminated together with a pair of laminate rollers and is cut out into a size of 210 mm×280 mm square. Next, while a rectangular voltage having from ±40V, 20 Hz is applied between the electrodes of both substrates, a minute shear stress of uniform deflectional deformation is given to the whole panel, so that a monoaxial horizontal orientation treatment is conducted.

When the membrane thickness of the panel is repeatedly measured by the reflection method, $d_2$ is found to be 2.1 μm. And since the retardation A $n_2 d_2$ is measured to be 285 nm with a spectrograph using a measurement wavelength of 550 nm, a value $\Delta n_2 = 0.135$ (550 nm) is obtained.

The tilt angle θ of the liquid crystal is 22.5 degrees at room temperatures, so the direction of the polarization axis 41 of a linear polarizer 34 is defined to be inclined at 22.5 degrees. As the polarizers 36A and 36B of the polarized glasses 33, a polarizer of which direction of the polarization axis 42 intersects at right angles with the direction of the polarization axis 41 of the linear polarizer 34 of the liquid crystal shutter 32, is prepared.

Using the retardation plate 37 having a nominal value 240 nm, the retardation plate 37 is adhered to the polarizer 36A on the left eye side so that the direction of the optical main axis 43 inclines at 45 degrees to the direction of the polarization axis 42 of the polarizers 36A and 36B. The residual retardation is measured using a spectrograph at the wavelength of 400 nm, 550 nm, and 900 nm. The result is shown in Table 1.

TABLE 1

(unit : nm)

| λ(nm) | $\Delta n_1 d_1$ | $\Delta n_2 d_2$ | $|\Delta n_1 d_1 - \Delta n_2 d_2|$ |
|---|---|---|---|
| 400 | 290 | 300 | 10 |
| 550 | 240 | 285 | 45 |
| 900 | 225 | 245 | 20 |

In this example, the residual retardation of less than 50 nm can be obtained through all visible light range, due to the usage of the retardation plate 37 having a nominal value of 240 nm.

Here, the liquid crystal shutter 32 and the polarized glasses 33 are placed one upon another, and a halogen lamp is disposed as a light source instead of the display device, to measure the contrast ratios of both right and left are measured The ratio for the right eye is 120 and that for the left eye is 105, which shows that both are good in contrast ratio.

The liquid crystal shutter 32 is installed in a 17 inche CRT 31 for a personal computer, and the display of the CRT 31 and movement of the liquid crystal shutter 32 are set in synchronization with each other and display of the actual image is observed through the polarized glasses 33. From the observation of the image there is no double reflected image through the right and left eyes, and a sense of three-dimensional image is obtained with few feeling of tiredness.

EXAMPLE 5

As a retardation plate 37 of the present example, the same cell as the liquid crystal cell 35 which is used for the liquid crystal shutter 32 is used instead of the retardation plate 37 used in the example 4. Other constructions are the same as in the example 4. Since the liquid crystal cell 35 uses a ferroelectric liquid crystal, it has a memory effect, so that the liquid crystal molecules are arranged in one direction without applying voltages. Then, the retardation plate 37 made of the liquid crystal cell is adhered to the polarizer 36A of the left eye side with aligning the direction of the optical main axis 43, in a similar way as in the case of example 4.

The measurement result of the residual retardation with a spectrograph shows that the values are less than 5 nm over all range of visible rays, which meets the requirement of the present invention.

The result of the contrast ratio measured in a similar way as in example 4 are 120 at the right eye side and 118 at the left eye side, which means good contrast ratio.

Further, the liquid crystal shutter 32 is installed in the CRT 31 for a personal computer in a similar way as in example 4 and an image is observed through the polarized glasses 33. From the observation of the image there is no double image through the right and left eyes, and a sharp and clear three-dimensional image is obtained.

EXAMPLE 6

A low molecular weight ferroelectric liquid crystal composition A (trade name CS-1015, manufactured by CHISSO CORPORATION) having a structure shown below by a chemical constitutional formula 30 and a phase transfer temperature shown below by a phase transition diagram 4 and a ferroelectric liquid crystal polymer B having phase transfer temperature shown below by a phase transition diagram 5 are mixed in the proportion of 50:50 (weight ratio) to prepare a liquid crystal C (SmA liquid crystal showing an electric field inductive tilt) having a phase transfer temperature shown below by a phase transition diagram 6.

(Chemical Constitutional Formula 30)

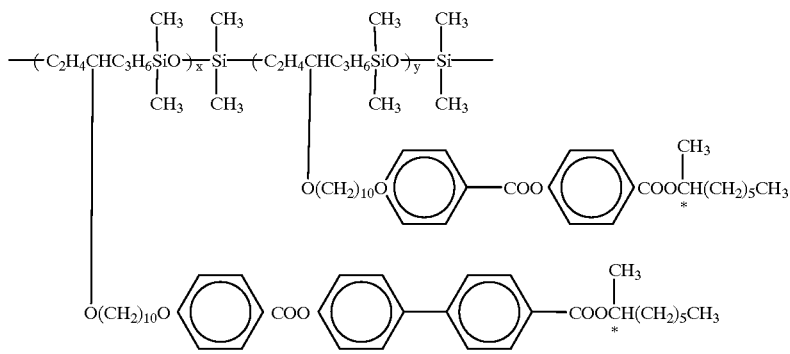

(Phase Transition Diagram 4)

(Phase Transition Diagram 5)

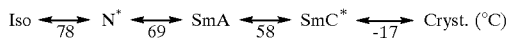

(Phase Transition Diagram 6)

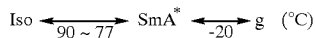

A substrate is prepared in a similar way as in example 4, using the liquid crystal C. As for the orientation, the substrate is cut out into a size of 340 mm×450 mm, then a minute shear stress of uniform deflectional deformation is given to the whole panel, while a direct current 40V is applied between the upper and lower electrodes, so that a monoaxial horizontal orientation treatment is performed.

When the applied voltage is 20V, the electric field inductive tilt angle θ of the liquid crystal is about 22.5 degrees, so the driving voltage is defined to be 20V.

The polarizers 34, 36A, 36B are placed in a similar way as in example 4, and a retardation plate 37 of which nominal retardation value is 270 nm is used for the left eye of polarized glasses.

Using a spectrograph, the residual retardations at the wavelength of 400 nm, 550 nm, and 900 nm are measured. The results are as follows.

$|\Delta n_1 d_1 - \Delta n_2 d_2| = 15$ nm ($\lambda=400$ nm), 10 nm ($\lambda=550$ nm), 15 nm ($\lambda=900$ nm).

That is, in this embodiment, the residual retardations can be less than 50 nm over all range of visible rays.

When the contrast ratio is measured in a similar way as in example 4, the value of the right eye side is 140, and that of the left eye side is 130, which shows good contrast ratio.

And the above described liquid crystal shutter 32 is installed into a 21 inches CRT 31 for a personal computer in a similar way as in example 4 and the image is observed through the polarized glasses 33. The observation of the image shows no double image through the right and left, and a good sense of three-dimensional image can be obtained.

Comparison 1

As a retardation plate 37 for the present comparison, a retardation plate 37 having a nominal value of 290 nm is used, instead of the retardation plate which is used in example 4 with a nominal value of 240 nm. Other structure is the same as in example 4.

The measurement result of residual retardation with a spectrograph at the wavelength of 400 nm, 550 nm, and 900 nm is shown in Table 2.

TABLE 2

| (unit : nm) | | | |
|---|---|---|---|
| λ(nm) | $\Delta n_1 d_1$ | $\Delta n_2 d_2$ | $|\Delta n_1 d_1 - \Delta n_2 d_2|$ |
| 400 | 360 | 300 | 60 |
| 550 | 290 | 285 | 5 |
| 900 | 235 | 245 | 10 |

That is, even the results at the wavelength λ of 550 nm and 900 nm meet the requirement of the present invention, the result at the wavelength λ of 400 nm exceeds the range specified by the present invention. Therefore, the residual retardation is not less than 50 nm over all ranges of visible rays.

And when the contrast ratio is measured in the same way as in example 4, the value for the right eye side is 120 and the left eye side is 45. Thus, in the case of the retardation plate 37 in the present comparison, it is understood that the contrast ratio is inferior because the required condition of the present embodiment is not fulfilled.

The liquid crystal shutter 32 in the comparison is installed in CRT 31 for a personal computer and the image is observed through the polarized glasses 33 in a similar way as in example 4. The sense of three-dimensional image can be obtained but an image through the left eye shows slightly double reflected and the observation for a long time brings a sense of tiredness.

What is claimed is:

1. A three-dimensional display having a display device alternately displaying an image for the right eye and an image for the left eye in division of the images at predetermined time periods, a liquid crystal shutter disposed in front of said display device and switching a linear polarization and an elliptical polarization in synchronization with image switching of said display device, and polarized glasses having different right and left polarization characteristics, for observing an image transmitted through said liquid crystal shutter, said three-dimensional display comprising:

a retardation plate disposed on said display device side of said polarized glasses to compensate elliptical polarization, wherein said retardation plate is configured to have a condition of $|\Delta n_1 d_1 - \Delta n_2 d_2| \leq 50$ nm in the range of light wavelength from 400 nm through 900 nm, for the retardation ($\Delta n_1 d_1$) of the retardation plate and a retardation ($\Delta n_2 d_2$) of a liquid crystal cell forming said liquid crystal shutter, wherein $\Delta n_1$: refractive index anisotropy of the retardation plate, $d_1$: thickness of the retardation plate, $\Delta n_2$: refractive index anisotropy of liquid crystal layer of the liquid crystal cell, and $d_2$: thickness of the liquid crystal layer of the liquid crystal cell.

2. The three-dimensional display according to claim 1, wherein a liquid crystal cell forming said liquid crystal shutter is selected from any one of a ferroelectric liquid crystal cell, an anti-ferroelectric liquid crystal cell, and a chiral smectic A liquid crystal cell showing electric field inductive tilt.

3. The three-dimensional display according to claim 1, wherein said retardation plate is formed by laminating at least two kinds of transparent materials having different refractive indexes for different wavelengths.

4. The three-dimensional display according to claim 1, wherein said retardation plate is a liquid crystal cell in which a liquid crystal is held between glass or plastic substrates.

5. The three-dimensional display according to claim 4, wherein the liquid crystal cell which forms said retardation deference plate is the same as the liquid crystal cell which forms said liquid crystal shutter.

6. The three-dimensional display according to claim 1, wherein an antireflection film is provided on the viewer side of the liquid crystal shutter to prevent reflection of the outside light which interferes with visibility.

7. A three-dimensional display comprising:

a display device, which alternatively displays an image for the right eye and an image for the left eye in division of the images at predetermined time periods;

a liquid crystal shutter disposed in front of said display device and being operated in synchronization with image switching of said display device, said liquid crystal shutter comprising a liquid crystal cell composed of a ferroelectric liquid crystal held between two film substrates;

a linear polarizer disposed in front of said display device; and a retardation plate disposed either in front or in the rear of said liquid crystal cell, which corrects the hue of the image transmitted therethrough, wherein the image transmitted through the liquid crystal shutter is observed as a three-dimensional image through polarized glasses of which polarizing directions differ in the right and left from each other.

8. The three-dimensional display according to claim 7, wherein said two film substrates comprise two plastic film substrates.

9. The three-dimensional display according to claim 7, wherein said liquid crystal shutter is a guest-host type containing a dichroic coloring agent in the liquid crystal.

10. The three-dimensional display according to claim 7, wherein said display device is any one of CRT, a liquid crystal panel, a plasma display, EL panel and LED.

\* \* \* \* \*